(12) United States Patent
Peters

(10) Patent No.: US 12,332,049 B2
(45) Date of Patent: *Jun. 17, 2025

(54) PROBE DEVICE WITH SPIRAL SPRING, ROTATING HEAD AND TESTING APPARATUS

(71) Applicant: Prüftechnik Dieter Busch GmbH, Ismaning (DE)

(72) Inventor: Jürgen Peters, Pliening (DE)

(73) Assignee: Fluke Corporation, Everett, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/405,469

(22) Filed: Jan. 5, 2024

(65) Prior Publication Data

US 2024/0142211 A1  May 2, 2024

Related U.S. Application Data

(63) Continuation of application No. 17/148,256, filed on Jan. 13, 2021, now Pat. No. 11,906,297.

(30) Foreign Application Priority Data

Jan. 16, 2020 (DE) .......................... 10 2020 200 480

(51) Int. Cl.
*G01B 5/00* (2006.01)
*G01N 27/87* (2006.01)
(Continued)

(52) U.S. Cl.
CPC ........... *G01B 5/0002* (2013.01); *G01N 27/87* (2013.01); *G01N 27/902* (2013.01); *G01N 27/9093* (2013.01)

(58) Field of Classification Search
CPC .... G01B 5/0002; G01N 27/87; G01N 27/902; G01N 27/9093; G01N 27/9013; G01R 1/06733

See application file for complete search history.

(56) References Cited

U.S. PATENT DOCUMENTS 11,906,297 B2 * 2/2024 Peters ................ G01N 27/9013
2017/0059298 A1 3/2017 Richards et al.

FOREIGN PATENT DOCUMENTS

DE 2945586 5/1981
DE 3240146 5/1984
(Continued)

OTHER PUBLICATIONS

English Machine Translation of DE-4121948-A1 (Year: 1993).*

*Primary Examiner* — David Z Huang
(74) *Attorney, Agent, or Firm* — DORITY & MANNING P.A.

(57) ABSTRACT

A probe device for a rotating head has at least one support arm that is mounted so as to rotate around an axis of rotation, at least one probe that is joined to the support arm, and at least one spring element that can be supported on the rotating head and engages at the support arm and that is provided for exerting a force on the support arm, which, as a result of this force, experiences a torque with respect to the axis of rotation. The support arm has at least one mount, which is concentric with the axis of rotation, for the spring element, which, when arranged on the mount, is bent at least in part around the axis of rotation. As a consequence, centrifugal forces that act on the spring element when the rotating head is in operation have no influence on the tension of the spring element.

20 Claims, 3 Drawing Sheets

(51) Int. Cl.
*G01N 27/9013* (2021.01)
*G01N 27/9093* (2021.01)

(56) References Cited

FOREIGN PATENT DOCUMENTS

| | | | |
|---|---|---|---|
| DE | 4121948 | 1/1993 | |
| DE | 4121948 A1 * | 1/1993 | ........... G01N 27/902 |
| DE | 102012108241 | 11/2013 | |
| DE | 102015214232 | 2/2017 | |
| WO | WO 2009/041139 | 4/2009 | |

* cited by examiner

PROBE DEVICE WITH SPIRAL SPRING, ROTATING HEAD AND TESTING APPARATUS

CROSS-REFERENCE TO RELATED APPLICATIONS

The present application is a continuation of U.S. application Ser. No. 17/148,256 having a filing date of Jan. 13, 2021, which is based upon and claims the right of priority to German Patent Application Number 102020200480 filed on Jan. 16, 2020. Applicant claims priority to and the benefit of each of such applications and incorporates each of such applications herein by reference in its entirety for all purposes.

BACKGROUND OF THE INVENTION

The present invention relates to a probe device for a rotating head, which has at least one support arm that is mounted so as to rotate around an axis of rotation, at least one probe that is joined to the support arm, and at least one spring element that can be supported on the rotating head and engages at the support arm, and is provided for exerting a force on the support arm, which, as a result of this force, experiences a torque with respect to the axis of rotation. Furthermore, the invention relates to a rotating head with at least one probe device of this kind, and a testing apparatus having at least one probe device of this kind and/or with at least one rotating head of this kind.

Testing apparatuses that are designed as rotating systems have come into use particularly for the examination of rod-shaped, round, metallic semifinished products for flaws, such a cracks and blowholes, by eddy current or leakage flux methods, In rotating systems of this kind, probe devices are arranged at rotatable rotating heads of the testing apparatus. By way of rotation of the rotating head together with the probe devices arranged thereon and insertion of an oblong test piece through a central through-opening through the rotating head, the probe devices move along a helical path in relation to the test piece. In order to be able to detect changes in the magnetic field resulting from the locations of flaws in the test piece, probes that are provided in the probe devices for the eddy current method must be situated at a predetermined distance from or as near as possible to the surface of the test piece. In the leakage flux method, in contrast, the probes are in contact with the test piece and rub along its surface. In this case, they wear out and have to be replaced on a regular basis. For these reasons, the contact pressure of the probe on the surface of the test piece should be as small as possible, without the probes lifting off the test piece, because lifting of the probe disrupts or even totally prevents the inspection.

Known from DE 10 2012 108 241 A1, therefore, is a probe device or a probe carrier for a testing apparatus that is designed as a rotating system for the nondestructive inspection of an elongated test piece by leakage flux or eddy currents. The probe carrier is designed in a modular and plug-in manner, so that the adaption of the testing apparatus to a changed diameter of the test piece can occur rapidly.

Other known probe devices, such as, for example, the probe device shown in DE 10 2015 214 232 A1, have a support arm that is mounted so as to move freely around a pivot point. The probe is arranged at one end of the support arm, which is mounted in the manner of a two-sided lever, and a counterweight is provided at the end of the support arm that is opposite this end. By a tension spring that is placed on the rotating head and engages at the support arm, a force and thus a torque is applied to the support arm. Insofar as a test piece moves irregularly, for example, through the through-opening of the rotating head, it is possible for the probes to avoid them due to the rotatable mounting of the support arm that carries them. By the counterweight as well as the tension spring engaged at the support arm, it is possible for a position of the probe to be adjusted at a predetermined distance from the surface of the test piece as well as, if needed, for a contact pressure of the probe on the test piece to be adjusted for a predetermined speed of rotation of the rotating head and a predetermined diameter of the test piece.

During the rotation of the rotating head, the spring element is subjected to centrifugal forces. Depending on the speed of rotation of the rotating head and depending on the position of the support arm, there is a change in the force exerted by the spring element on the support arm and thus also in the torque acting on the support arm around the axis of rotation. In particular, the contact pressure or the position of the probes in relation to the test piece is influenced in this way. If the contact pressure of the probe on the test piece is increased, then the wear of the probes increases. In contrast, if the contact pressure is decreased, then the probes can lift from the test piece or increase their distance from the test piece, depending on whether a magnetic flux method or an eddy current method is involved, as a result of which the inspection is disrupted or made totally impossible.

In order that, in the case of large test pieces and corresponding speeds of rotation of the rotating head, the probes do not lift from the surface of the test piece, as a result of which the inspection operation is interrupted in the leakage flux method, there is a tendency in practice to design the spring force and thus the contact pressure of the probe on the test piece to be excessively high or to reduce the speed of rotation of the rotating head. However, a high contact pressure leads to an increased wear of the probe rubbing over the surface of the test piece, while a reduction in the speed of rotation of the rotating head leads to a reduced throughput of the test piece. On account of the influences of the speed of rotation and the diameter of the test piece, it is also found that, in practice, the correct adjustment of the distance of the probe from the surface of the test piece is difficult to make in the eddy current method.

SUMMARY OF THE INVENTION

The object of the present invention, therefore, is to create a probe device, a rotating head, and a testing apparatus that make possible an adjustment of probes in relation to a test piece that is independent of centrifugal forces.

This object is achieved by the probe device, by the rotating head, and by the testing apparatus of the present invention.

Whereas, in known probe devices, the spring element is generally designed as a tension spring, which engages at a point on the support arm that is spaced apart from the axis of rotation, so that the contact pressure of the probe on the test piece changes with the speed of rotation of the rotating head or with the diameter of the test piece, the support arm in the probe device according to the invention has at least one mount for the spring element that is concentric with the axis of rotation and the spring element is bent at least in part around the axis of rotation when it is arranged in the mount. In other words, the axis of rotation is embraced at least in part by the spring element or the spring element is coiled or wound at least in part around the axis of rotation. In this way, the spring element can coil around the mount or around the axis of rotation with at least one turn or with a plurality of turns or can be wound once or several times around the mount or around the axis of rotation. In this case, the spring element that is bent or wound around the axis of rotation engages at a point on the support arm that is spaced apart from the axis of rotation. This point can be located, in particular, on the mount, but it can also be spaced apart from the mount.

Quite generally, the support arm can have a longitudinal axis and it is possible to design the longitudinal axis and the axis of rotation to be skewed with respect to each other. However, the support arm or the longitudinal axis thereof can also intersect the axis of rotation. Furthermore, the probe can be fastened at the ends of two support arms or a plurality of support arms that are arranged parallel to one another and are all mounted so as to rotate around the same axis of rotation. In addition, in order to adjust the contact pressure or the position of the probe, at least one counterweight can be arranged on the support arm, the position of which can be shifted advantageously along the support arm.

Because the spring element is bent or wound around the mount that is concentric with the axis of rotation and thus also around the axis of rotation, the spring element is pressed against the mount under the action of centrifugal forces, without any bending stresses thereby being produced in the spring element. Accordingly, the spring element also cannot exert forces caused by centrifugal forces on the support arm and, consequently, there are no torques on it. Instead, the support arm remains balanced for any speeds of rotation of the rotating head and any diameters of the test piece. A lifting or removal of the probe from the test piece does not occur even when the speed of rotation of the rotating head is high. Because of the always optimal or least possible adjusted contact pressure, moreover, the wear of the probes is diminished, so that the service lives of the probes and the maintenance intervals thereof are markedly lengthened. Because the contact pressure of the probe is produced exclusively by way of the spring force and the support arm need be balanced only once by suitable counterweights, for example, it is possible to dispense with subsequent operations on the counterweights for adjustment of the contact pressure of the probes on the surface of the test piece or for adjustment of the distance of the probes from the surface of the test piece. Such a subsequent adjustment of counterweights is then only still necessary if probes of different weight are used. In particular, a diameter-dependent adjustment of the counterweights or even a compulsory reduction in the linear speed is no longer required. Because required speeds of rotation of the rotating head can always be attained, the productivity of inspection devices having the probe device according to the invention is increased.

The spring element can be, in particular, a torsion spring, such as, for example, a spiral spring or an elliptical spring or a parabolic spring or a wave spring or a wire spring or a leg spring. Torsion springs commonly refer to elements that can be elastically deformed by way of a bending with a bending torque, as a result of which a bending stress is produced in the element. Torsion springs include, for example, spiral springs, that is, strongly bent metal bands that are wound in a spiral in a plane. By contrast, elliptical springs consist of slightly bent leaf springs, which, in general, are mounted in pairs against each other as spring assemblies containing individual spring leaves that lie one on top of the other. In the case of parabolic springs, instead of a layered spring assembly, leaf springs with a strength that decreases in a parabolic manner from the middle to the ends are used. Wave springs, in turn, are rings made up of wavy flat wire, in which, under a load, the waves are bent out. Wave springs can be layered one on top of the other in assemblies or else used in a single layer. In contrast to leaf springs having a rectangular cross section, wire springs consist of wires. The wire springs include, among others, leg springs, which are wire springs that are coiled or wound in a helical shape and have projecting straight ends that serve for the introduction of a torque that bends the wire.

It is fundamentally possible for the spring element to be joined or to be fixed in place to the support arm in either a permanent manner or in a detachable manner. Correspondingly, the spring element can be supported on the rotating head by joining it in a permanent manner or in a detachable manner at a suitable point of the rotating head or at an element of the rotating head that is intended for this purpose. Preferred, however, is an embodiment of the probe device in which the spring element is not joined to the rotating head, but rather has a support segment, such as, for example, an end segment, for supporting it on or resting it against a stop of the rotating head. An embodiment of this kind has the special advantage that a simple exchange of the individual spring element is possible when the spring element is not mounted on the support arm or on the mount thereof or that, in the case of permanent or detachable mounting of the spring element on the support arm, an exchange of the support arm or even of the entire probe device is possible, without it being necessary for this purpose to detach or separate the spring element from the rotating head. The installation of a new spring element or of the support arm or of the probe device is likewise simple to perform.

The probe device according to the invention is suitable for any rotational system, namely, also for those in which probes are movably suspended on support arms. It is also possible for contact-free inspection methods to provide a mechanical delimiter for limiting the angle of rotation for the support arm and/or the probe, against which the support arm or the probe can rest with slight pressure, so that it can get out of the way as easily as possible. In this way, the energy of impact of the test piece on probe deflectors can be reduced.

Because the probe of the probe device needs to have a connection to the evaluation unit in order to be able to transmit measurement signals to the evaluation unit, for example, probe cables are guided from the probe through the support arm. Probe cables often extend as cable bends or loops from a connection terminal or inlet on the rotating head to the probe device and are guided in a cable conduit of the latter via a support arm of the probe device to the probe in order to ensure the mobility of the support arms. Like the spring elements of known probe devices, these cable bends also experience a centrifugal force when the rotating head rotates and, as a consequence thereof, exert a torque on the support arm, as a result of which they influence the contact pressure or the position of the probes in relation to the test piece.

In order to diminish or prevent torques of this kind, the probe device preferably has at least one cable conduit for guiding a probe cable, with the cable conduit having a first end segment that extends along the support arm from the probe to the axis of rotation and a second end segment that starts essentially from the axis of rotation. In other words, both the first end segment and the second end segment essentially rest with one of their ends against the axis of rotation or else one of their respective ends is essentially positioned on the axis of rotation or one of their respective ends is located at the level of the axis of rotation. Both the first end segment and the second end segment thus enclose an angle with the axis of rotation. In this way, it is brought about that a probe cable is guided at the level of the axis of rotation of the support arm to the probe device or to the probe thereof or is guided away from it. In consequence thereof, the probe cable can bring about no torque whatsoever on the support arm when both the probe device and the probe cable are rotated as part of a rotating head of a rotating system and experience a centrifugal force. Accordingly, the probe cable can also exert no influence whatsoever on the adjustment of the position of the probe or of the contact pressure thereof on the surface of test pieces.

Embodiments of the probe device are possible in which the first end segment and the second end segment are joined directly to each other. In these cases, the two end segments essentially transition directly into each other at the pivot point of the support arm. In other embodiments of the probe device, a cable conduit segment that extends along the axis of rotation joins the first end segment and the second end segment to each other. For example, the first end segment can lead from the probe to the axis of rotation or to the pivot point of the support arm, where it opens into the cable conduit segment that is parallel to the axis of rotation and, in turn, leads away from the pivot point of the support arm along the axis of rotation and opens into the second end segment at a distance from the support arm.

In the probe device according to the invention, the support arm can be mounted as a kind of one-sided or two-sided lever. In both cases, the probe can be joined to it at an end or end segment of the support arm. If the support arm is mounted as a kind of two-sided lever, then at least one counterweight, besides the probe, is preferably fastened on the support arm, with the probe and the counterweight being located on opposite sides with respect to the axis of rotation of the support arm, namely, preferably at opposite ends or end segments of the support arm.

Advantageously, a rotating head according to the invention has at least one probe device according to the invention. A suitable choice of the spring constants of the spring element can contribute to the adjustment of the position of the probe in relation to the test piece or of the contact pressure of the probe on the test piece.

A testing apparatus according to the invention preferably has at least one pair of probe devices, the probes of which are arranged facing each other. If a test piece is arranged or inserted between the probes, then the probes can inspect simultaneously two sides of the test piece that lie opposite to each other.

BRIEF DESCRIPTION OF THE DRAWING FIGURES

The invention will be explained below in detail on the basis of drawings. Herein:

DESCRIPTION OF THE INVENTION

Figure 1:
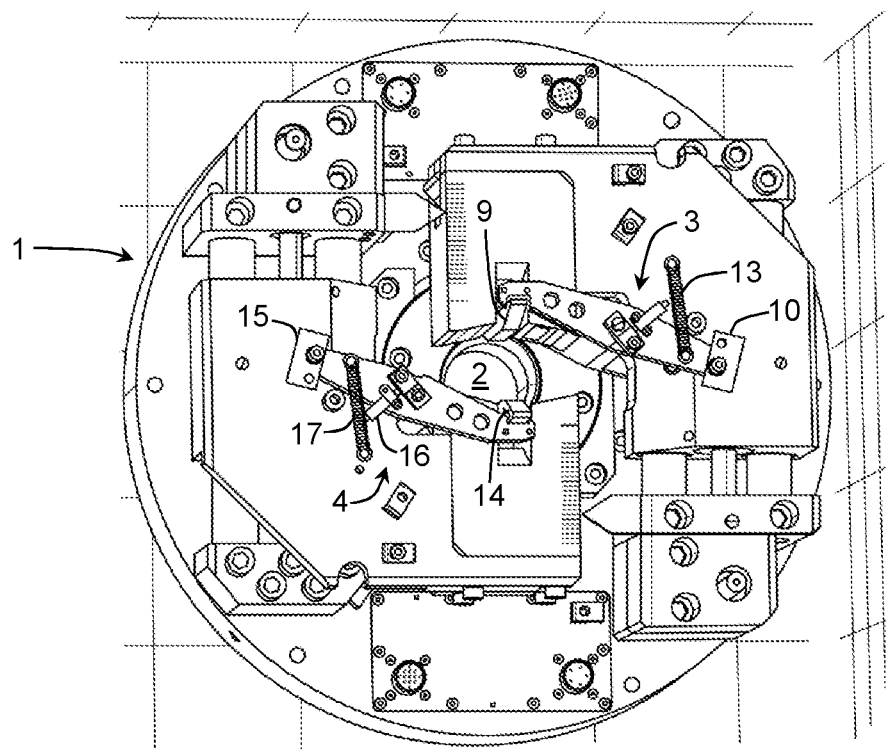
FIG. 1 shows a rotating head in accordance with the prior art with two probe devices.

Depicted in FIG. 1 is a known circular rotating head 1 of a testing apparatus that is designed as a rotating system. The rotating head 1 has a central through-hole 2 and two essentially identically designed probe devices 3 and 4.

Figure 2:
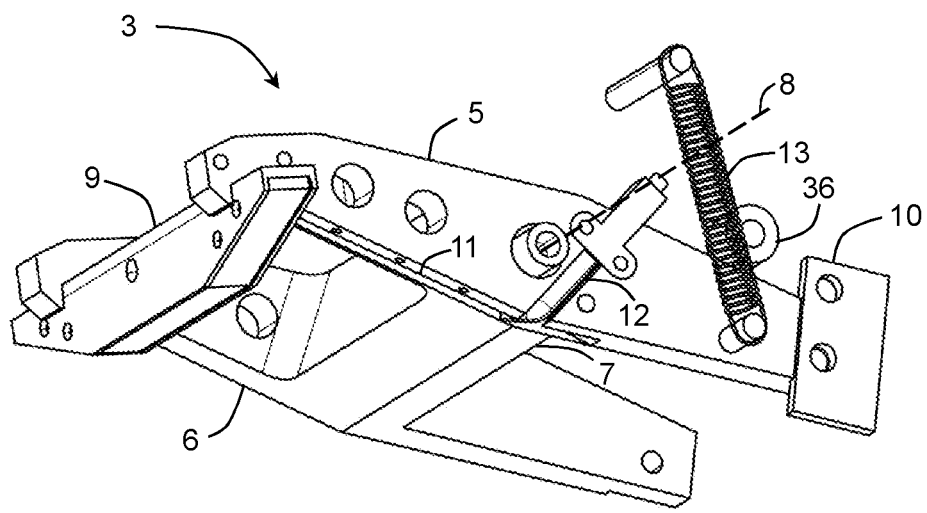
FIG. 2 shows a probe device in accordance with the prior art.
Figure 3:
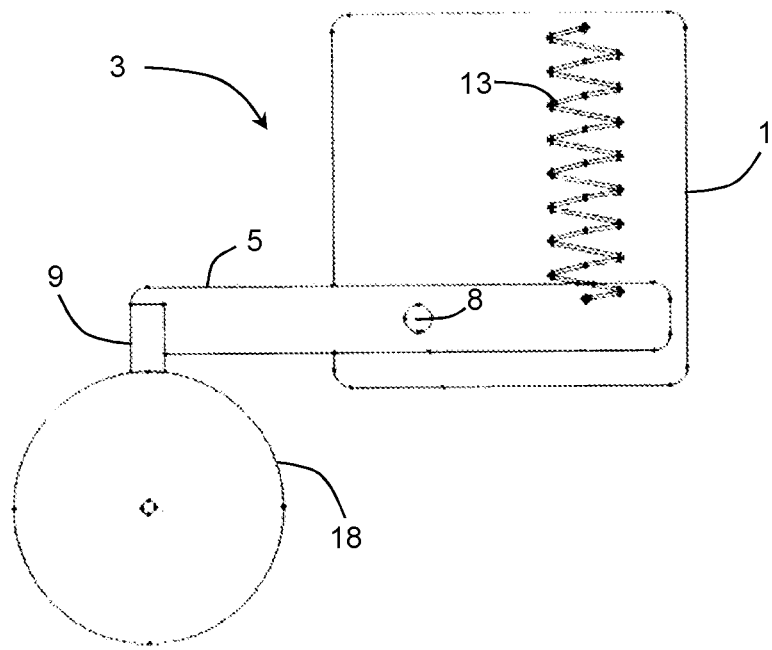
FIG. 3 shows a schematic side view of the probe device of FIG. 2.

The probe device 3 can be seen enlarged in FIG. 2 and in a schematic side view in FIG. 3. It comprises two elongated support arms 5 and 6, which are arranged parallel with respect to each other and are joined to each other by an essentially centrally arranged middle connecting piece 7. At the level of the middle connecting piece 7, the support arms 5 and 6 are mounted so as to rotate as a kind of two-sided lever around an axis of rotation 8, which is drawn dashed in FIG. 2. A probe 9 that extends between the support arms 5 and 6 is held by the ends of the support arms 5 and 6 that face the through-hole 2, while a counterweight 10 is arranged at the end of the support arm 5 that faces away from the through-hole 2. Furthermore, the probe device 3 has a cable conduit with a first end segment 11 that extends starting from the probe 9 along the support arm 5 and a second end segment 12 that adjoins the first end segment 11, with the second end segment 12 neither intersecting the axis of rotation 8 nor starting from it. The cable conduit is provided for the mounting of a probe cable, which, for reasons of clarity, is not depicted in the figures. Finally, a coil tension spring or coil spring 13 engages at a point between the middle connecting piece 7 and the counterweight 10 on the support arm 5 and consequently at an end segment of the support arm 5 that faces away from the probe 9.

In terms of its construction, the probe device 4 corresponds essentially to the probe device 3. In particular, the probe device 4 also has a probe 14, which is fastened at end segments of its support arm. Provided at an end of a support arm of the probe device 4 opposite the probe is a counterweight 15. From the spatial perspective of FIG. 1, only the second end segment 16 of the cable conduit of the probe device 4 is visible. A coil spring 17 engages with one end at an end segment of the support arm of the probe device 4 that faces away from the probe 14 at a point between the second end segment 16 of the cable conduit and the counterweight 15 on the support arm.

In the rotating head 1, the two probe devices 3 and 4 are arranged in such a way that their respective probes 9 and 14 lie essentially diametrically opposite to each other with respect to the through-hole 2.

In the operation of the testing apparatus, one of the probes 9 and 14 is then inserted through the hole 2 toward the elongated test piece 18 to be inspected, while the rotating head 1 is rotated around the test piece 18. Through suitable choice of the counterweights 10 and 15 of the probe devices 3 and 4 as well as of the coil springs 13 and 17 on the probe devices 3 and 4, it is possible to adjust the contact pressure with which the probes 9 and 14 press against the surface of the test piece 18. The distance from the test piece 18 is adjusted in a contact-free method by mechanical delimitations of the angles of rotation, such as, for example, by the delimiter 36 depicted in FIG. 2 for the probe device 3. In the contact method, the delimiter 36 serves to hold back the support arm 5 in order that the path for the test piece 18 is not blocked. In contrast, the distance from the test piece 18 is influenced by the counterweight 10 and the coil spring 13 to the extent that, in the contact method, the probe 9 lifts from the test piece 18 or, in the contact-free method, the contact to the delimiter 36 is lost.

During the rotation of the rotating head 1, the coil springs 13 and 17 are subjected to centrifugal forces. These centrifugal forces influence the spring tensions of the coil springs 13 and 17 and thus the forces and torques exerted on the respective support arms by the coil springs 13 and 17. For this reason, the readjusted distance of the probes 9 and 14 from the surface of the test piece 18 or the contact pressure thereof on the surface of the test piece 18 is influenced. Moreover, this influencing is dependent on the respective speed of rotation of the rotating head 1.

Figure 4:
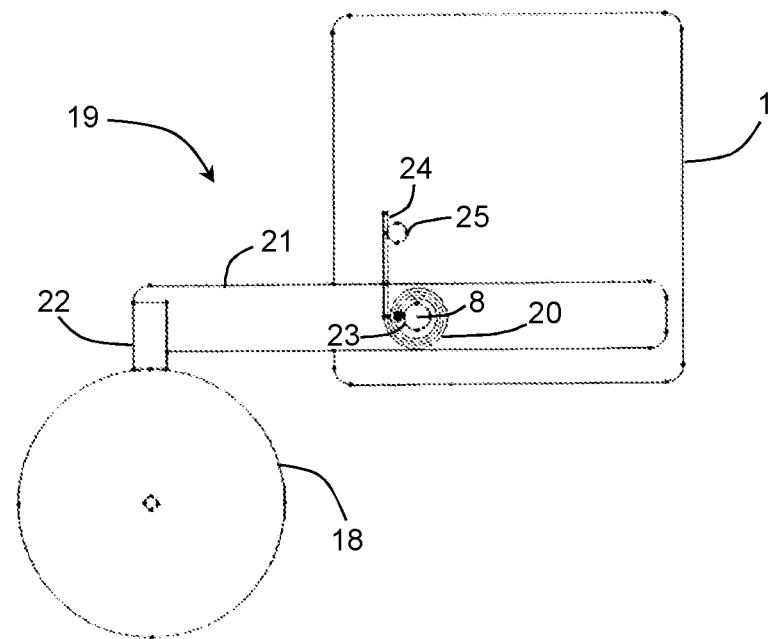
FIG. 4 shows a schematic side view of a probe device according to the invention.
Figure 5:
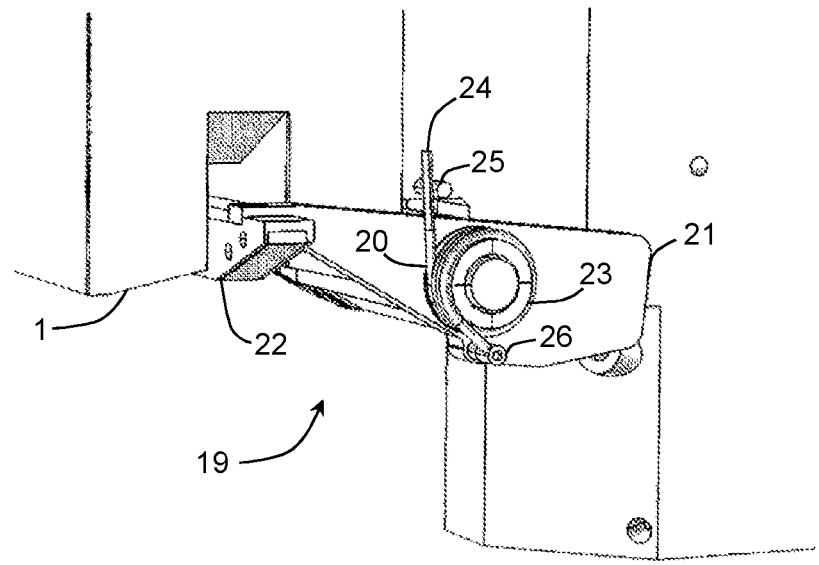
FIG. 5 shows a spatial depiction of a probe device according to the invention.

In order to prevent this influence of the centrifugal forces, a curved spring element instead of a coil spring is provided in the probe device 19, which is depicted in FIG. 4 in a schematic side view and in FIG. 5 in a spatial view. What is involved in the present case is a leg spring 20. As in the case of the previously described probe device 3, the probe device 19 also has support arms 21 for a probe 22, which are mounted so as to be able to rotate around the axis of rotation 8. A mount 23 for the leg spring 20 is provided on one of the support arms 21 in each case and is concentric with the axis of rotation 8. The leg spring 20 is arranged on the mount 23 and wound a plurality of times around the mount 23. By an end segment 24, the leg spring 20 rests against a projecting stop or stop pin 25 of the rotating head 1 and is thereby supported against it. In addition, the leg spring 20 engages at a point on the support arm 21 that is spaced apart from the axis of rotation 8, with it being fixed in place on the support arm 21 in this case by fastener 26.

As a result of the fact that end segment 24 of the leg spring 20 presses against the stop pin 25 and the fact that it is fixed in place by the fastener 26, through which it engages at the support arm 21, it is possible for the leg spring 20 to exert forces and torques on the support arm 21. In contrast, it is not possible during the operation of the rotating head 1 for arising centrifugal forces to increase the bending stress of the leg spring 20 and thereby to influence the forces and effected torques that act on the support arm 21 by way of the leg spring 20, because the leg spring 20 is arranged concentric with the axis of rotation 8. Instead of this, the leg spring 20 is pressed against the mount 23 by the centrifugal forces, without the bending stress thereof being influenced. For this reason, the contact pressure of the probe 22 against the surface of the test piece 18 or their distance from each other is also independent of the speed of rotation of the rotating head 1 and the diameter of the test piece 18.

When the rotating head 1 rotates, the probe cables, which are accommodated in the cable conduits of the known probe devices 3 and 4 and extend, after exiting from the second end segments 12 and 16 thereof, in an arc shape up to a connection terminal or inlet of the rotating head 1, experience centrifugal forces. These centrifugal forces, in turn, exert a lever effect on the rotatably mounted probe devices 3 and 4, as a result of which the preadjusted distance of the probes 9 and 14 from the surface of the test piece 18 or the contact pressure thereof on the surface of the test piece 18 is influenced.

Figure 6:
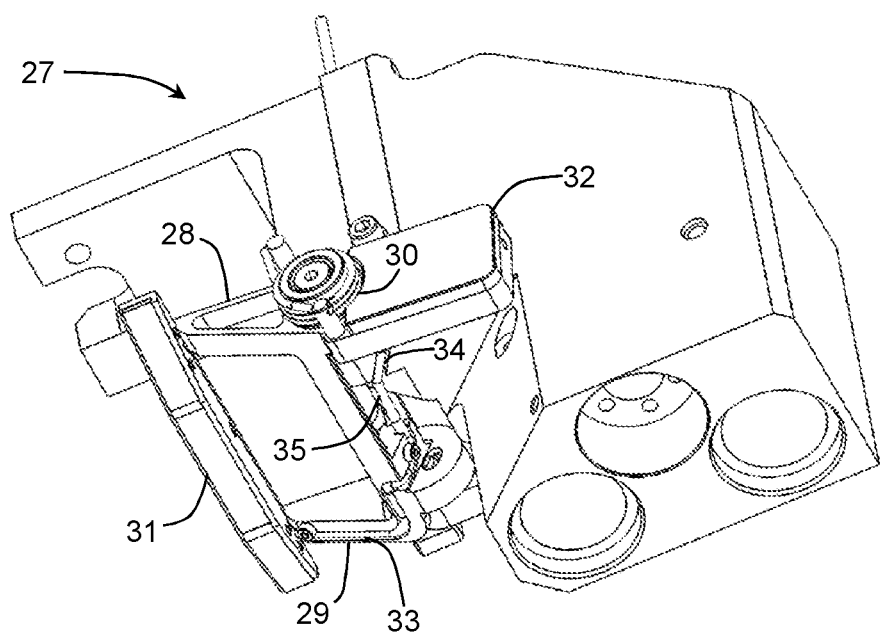
FIG. 6 shows a spatial depiction of a probe device with a cable conduit.

FIG. 6 shows a probe device 27 for which this problem, too, is surmounted. In contrast to the above-described known probe devices 3 and 4, the probe device 27 comprises two support arms 28 and 29, which are designed as a one-piece component. The two support arms 28 and 29 are mounted so as to be able to rotate around the same axis of rotation, with the rotation thereof being influenced by a leg spring 30 in the way described above. Held at an end of the support arms 28 and 29 is a probe 31, which extends between the support arms 28 and 29, while, at the end of the support arm 29 lying opposite to it, a counterweight 32 is arranged.

The probe device 27 differs from the previously described probe devices 3 and 4 not only in terms of the one-piece design of the support arms 28 and 29, but also in terms of its cable conduit for the mounting of probe cables. Thus, the cable conduit of the probe device 27 has a first end segment 33 that extends along the support arm 28 from the probe 31 to the axis of rotation. A second end segment 34 extends essentially from the axis of rotation or encloses an angle with it. The first end segment 33 and the second end segment 34 are joined by a cable conduit segment 35, which is designed as a hollow shaft and extends along the axis of rotation. In the installed state of the probe device 27 in the rotating head 1, the second end segment 34 is arranged permanently or detachably in relation to the rotating head 1, while the support arms 28 and 29 can rotate around the axis of rotation and thus can make a rotational movement in relation to the second end segment 34. Inside of the hollow cable conduit segment 35, it is possible for a probe cable to twist flexibly when the support arms 28 and 29 are tilted, without its position or its distance being changed significantly. Provided on the support arm 29 is a cable conduit that corresponds to the cable conduit of the support arm 28.

As a result of the special cable conduit with the first end segment 33 running up to the axis of rotation, the second end segment 34 starting from the axis of rotation, and the cable conduit segment 35 being parallel to the axis of rotation, a probe cable can be guided in such a way that, when the rotating head 1 rotates, it is possible to minimize the influence of the centrifugal force on the probe device 27. In particular, in the case of the probe device 27, no cable bends whatsoever arise, which would be subjected to a centrifugal force of this kind and would transmit this centrifugal force to the support arms 28 and 29. When, for example, the support arm 28 rotates around the axis of rotation, the probe cable can freely twist inside of the hollow cable conduit segment 35, without changing its shape or becoming distant from the axis of rotation, so that it cannot exert any forces due to the rotation of the rotating head 1 on the probe device 27. Accordingly, the probe device 27 can be balanced a single time by way of the counterweight 32 in accordance with the weight of the probe 31. The probe device 27 that has been balanced then functions uniformly over the entire range of diameter and range of rotational speeds of the rotating head 1. Accordingly, the contact pressure on the test piece 18 or the distance of the probe 31 from the surface thereof is independent of the centrifugal force.

In another embodiment of a probe device according to the invention, a hollow cable conduit segment is dispensed with and the first end segment is joined to the second end segment directly.

It would be appreciated by those skilled in the art that various changes and modifications can be made to the illustrated embodiments without departing from the spirit of the present invention. All such modifications and changes are intended to be covered by the appended claims.

What is claimed is:
1. A testing apparatus, comprising:
a rotating head;
a probe device supported relative to the rotating head, the probe device comprising:
  at least one support arm mounted so as to rotate around an axis of rotation;
  at least one probe supported by the at least one support arm; and
  at least one spring element supported on the rotating head and engaged with the at least one support arm and wound at least once about a portion of the at least one support arm about the axis of rotation, the at least one spring element configured to exert a torque on the at least one support arm with respect to the axis of rotation; and a cable conduit configured to guide a probe cable of the testing apparatus, the cable conduit comprising:
    a first end segment extending along the at least one support arm from the probe to the axis of rotation; and
    a second end segment starting at the axis of rotation and extending away therefrom.

2. The testing apparatus of claim 1, wherein the at least one support arm rotates around the axis of rotation relative to the second end segment with rotation of the rotating head.

3. The testing apparatus of claim 2, wherein the second end segment is arranged permanently or detachably in relation to the rotating head.

4. The testing apparatus of claim 1, wherein the cable conduit further comprises a cable conduit segment extending along the axis of rotation and joining the first end segment to the second end segment.

5. The testing apparatus of claim 4, wherein the probe cable is configured to extend through the cable conduit segment along the axis of rotation and can freely twist within the cable conduit segment.

6. The testing apparatus of claim 1, wherein the first end segment and second end segment are joined directly to each other at the axis of rotation.

7. The testing apparatus of claim 1, wherein the at least one support arm comprises a first support arm and a second support arm, the at least one probe extending between the first and second support arms and being supported by the first and second support arms.

8. The testing apparatus of claim 7, wherein the cable conduit is provided in association with at least one of the first support arm or the second support arm.

9. The testing apparatus of claim 7, wherein the first and second support arms are connected to each other and rotate together about the axis of rotation relative to the second end segment with rotation of the rotating head.

10. The testing apparatus of claim 7, further comprising a counterweight arranged on one of the first support arm or the second support arm.

11. The testing apparatus of claim 4, wherein the cable conduit segment comprises a hollow shaft.

12. The testing apparatus of claim 1, wherein the support arm has at least one mount for the at least one spring element, the at least one mount being concentric with the axis of rotation, the at least one spring element being wound at least once about a portion of the at least one support arm about the axis of rotation when arranged on the at least one mount.

13. The testing apparatus of claim 1, wherein the at least one spring element includes a torsion spring.

14. A probe device for a rotating head, the probe device comprising:
    at least one support arm mounted so as to rotate around an axis of rotation;
    at least one probe supported by the at least one support arm; and
    at least one spring element engaged with the at least one support arm and wound at least once about a portion of the at least one support arm about the axis of rotation, the at least one spring element configured to exert a torque on the at least one support arm with respect to the axis of rotation; and
    a cable conduit configured to guide a probe cable, the cable conduit comprising:
        a first end segment extending along the at least one support arm from the probe to the axis of rotation; and
        a second end segment starting at the axis of rotation and extending away therefrom.

15. The probe device of claim 14, wherein the at least one support arm is configured to rotate around the axis of rotation relative to the second end segment.

16. The probe device of claim 14, wherein the cable conduit further comprises a cable conduit segment extending along the axis of rotation and joining the first end segment to the second end segment.

17. The probe device of claim 16, wherein the probe cable is configured to extend through the cable conduit segment along the axis of rotation and can freely twist within the cable conduit segment.

18. The probe device of claim 14, wherein the first end segment and second end segment are joined directly to each other at the axis of rotation.

19. The probe device of claim 14, wherein the at least one support arm comprises a first support arm and a second support arm, the at least one probe extending between the first and second support arms and being supported by the first and second support arms.

20. The probe device of claim 19, wherein the cable conduit is provided in association with at least one of the first support arm or the second support arm.

* * * * *